US009043451B2

(12) United States Patent
Bantukul et al.

(10) Patent No.: US 9,043,451 B2
(45) Date of Patent: May 26, 2015

(54) METHODS, SYSTEMS, AND COMPUTER READABLE MEDIA FOR MANAGING THE FLOW OF SIGNALING TRAFFIC ENTERING A SIGNALING SYSTEM 7 (SS7) BASED NETWORK

(75) Inventors: Apirux Bantukul, Cary, NC (US); Peter J. Marsico, Chapel Hill, NC (US)

(73) Assignee: TEKELEC, INC., Morrisville, NC (US)

( * ) Notice: Subject to any disclaimer, the term of this patent is extended or adjusted under 35 U.S.C. 154(b) by 1450 days.

(21) Appl. No.: 12/183,414

(22) Filed: Jul. 31, 2008

(65) Prior Publication Data

US 2009/0034512 A1 Feb. 5, 2009

Related U.S. Application Data

(60) Provisional application No. 60/962,766, filed on Jul. 31, 2007.

(51) Int. Cl.
 H04L 12/24 (2006.01)
 H04W 88/16 (2009.01)
 H04M 7/12 (2006.01)
 (Continued)

(52) U.S. Cl.
 CPC ............ *H04M 7/123* (2013.01); *H04M 7/1285* (2013.01); *H04Q 3/0025* (2013.01); *H04Q 3/66* (2013.01); *H04Q 2213/13097* (2013.01); *H04Q 2213/13141* (2013.01); *H04Q 2213/13176* (2013.01); *H04Q 2213/13196* (2013.01); *H04Q 2213/13345* (2013.01); *H04Q 2213/13353* (2013.01)

(58) Field of Classification Search
 CPC ............ H04L 65/1023; H04L 65/1046; H04L 65/1033; H04M 7/1245
 See application file for complete search history.

(56) References Cited

U.S. PATENT DOCUMENTS

| 4,888,726 A | 12/1989 | Struger et al. |
| 5,008,929 A | 4/1991 | Olsen et al. |
| 5,142,622 A | 8/1992 | Owens |

(Continued)

FOREIGN PATENT DOCUMENTS

| CA | 2239764 | 12/1998 |
| EP | 0 853 411 A2 | 7/1998 |

(Continued)

OTHER PUBLICATIONS

Commonly-assigned, co-pending U.S. Appl. No. 13/465,464, filed May 7, 2012, Unpublished.

(Continued)

*Primary Examiner* — Asad Nawaz
*Assistant Examiner* — Jason Harley
(74) *Attorney, Agent, or Firm* — Jenkins, Wilson, Taylor & Hunt, P.A.

(57) ABSTRACT

Methods, systems, and computer readable media for managing the flow of signaling traffic entering a signaling system 7 (SS7) based network having a plurality of gateways for connecting the SS7 network to a non-SS7 network are disclosed. According to one aspect, a method for managing the flow of signaling traffic entering the SS7 based network includes generating, at a signaling node within the SS7 network, a route management message including information for identifying one of the plurality of gateways as the preferred gateway for traffic into the SS7 network. The message is sent to a node in the non-SS7 network for directing traffic into the SS7 network via the identified gateway.

26 Claims, 8 Drawing Sheets

(51) Int. Cl.
*H04Q 3/00* (2006.01)
*H04Q 3/66* (2006.01)

(56) References Cited

U.S. PATENT DOCUMENTS

| | | | |
|---|---|---|---|
| 5,208,811 A | 5/1993 | Kashio et al. |
| 5,239,542 A | 8/1993 | Breidenstein et al. |
| 5,315,641 A | 5/1994 | Montgomery et al. |
| 5,384,840 A | 1/1995 | Blatchford et al. |
| 5,420,916 A | 5/1995 | Sekiguchi |
| 5,430,727 A | 7/1995 | Callon |
| 5,509,010 A | 4/1996 | La Porta et al. |
| 5,568,487 A | 10/1996 | Sitbon et al. |
| 5,581,558 A | 12/1996 | Horney, II et al. |
| 5,583,927 A | 12/1996 | Ely et al. |
| 5,586,177 A | 12/1996 | Farris et al. |
| 5,592,530 A | 1/1997 | Brockman et al. |
| 5,638,431 A | 6/1997 | Everett et al. |
| 5,640,446 A | 6/1997 | Everett et al. |
| 5,650,998 A | 7/1997 | Angenot et al. |
| 5,651,002 A | 7/1997 | Van Seters et al. |
| 5,657,452 A | 8/1997 | Kralowetz et al. |
| 5,664,102 A | 9/1997 | Faynberg |
| 5,675,635 A | 10/1997 | Vos et al. |
| 5,680,437 A | 10/1997 | Segal |
| 5,680,552 A | 10/1997 | Netravali et al. |
| 5,694,463 A | 12/1997 | Christie et al. |
| 5,696,809 A | 12/1997 | Voit |
| 5,701,301 A | 12/1997 | Weisser, Jr. |
| 5,706,286 A | 1/1998 | Reiman et al. |
| 5,712,903 A | 1/1998 | Bartholomew et al. |
| 5,732,213 A | 3/1998 | Gessel et al. |
| 5,740,374 A | 4/1998 | Raffali-Schreinemachers |
| 5,761,281 A | 6/1998 | Baum et al. |
| 5,761,500 A | 6/1998 | Gallant et al. |
| 5,764,750 A | 6/1998 | Chau et al. |
| 5,764,955 A | 6/1998 | Doolan |
| 5,768,361 A | 6/1998 | Cowgill |
| 5,768,525 A | 6/1998 | Kralowetz et al. |
| 5,774,695 A | 6/1998 | Autrey et al. |
| 5,781,534 A | 7/1998 | Perlman et al. |
| 5,787,255 A | 7/1998 | Parlan et al. |
| 5,793,771 A | 8/1998 | Darland et al. |
| 5,802,285 A | 9/1998 | Hirviniemi |
| 5,809,028 A | 9/1998 | Nethercott et al. |
| 5,812,781 A | 9/1998 | Fahlman et al. |
| 5,815,669 A | 9/1998 | Lee et al. |
| 5,828,844 A | 10/1998 | Civanlar et al. |
| 5,831,975 A | 11/1998 | Chen et al. |
| 5,838,782 A | 11/1998 | Lindquist |
| 5,852,660 A | 12/1998 | Lindquist et al. |
| 5,867,495 A | 2/1999 | Elliott et al. |
| 5,870,565 A | 2/1999 | Glitho |
| 5,872,782 A | 2/1999 | Dendi |
| 5,878,129 A | 3/1999 | Figurski et al. |
| 5,889,954 A | 3/1999 | Gessel et al. |
| 5,892,822 A | 4/1999 | Gottlieb et al. |
| 5,898,667 A | 4/1999 | Longfield et al. |
| 5,912,887 A | 6/1999 | Sehgal |
| 5,917,900 A | 6/1999 | Allison et al. |
| 5,920,562 A | 7/1999 | Christie et al. |
| 5,923,659 A | 7/1999 | Curry et al. |
| 5,926,482 A | 7/1999 | Christie et al. |
| 5,940,598 A | 8/1999 | Strauss et al. |
| 5,949,871 A | 9/1999 | Kabay et al. |
| 5,958,016 A | 9/1999 | Chang et al. |
| 5,966,431 A | 10/1999 | Reiman et al. |
| 5,974,052 A | 10/1999 | Johnson et al. |
| 5,991,301 A | 11/1999 | Christie |
| 5,995,608 A | 11/1999 | Detampel, Jr. et al. |
| 6,006,098 A | 12/1999 | Rathnasabapathy et al. |
| 6,011,780 A | 1/2000 | Vaman et al. |
| 6,011,794 A | 1/2000 | Mordowitz et al. |
| 6,011,803 A | 1/2000 | Bicknell et al. |
| 6,014,379 A | 1/2000 | White et al. |
| 6,018,515 A | 1/2000 | Sorber |
| 6,021,126 A | 2/2000 | White et al. |
| 6,023,502 A | 2/2000 | Bouanaka et al. |
| 6,026,091 A | 2/2000 | Christie et al. |
| 6,061,364 A | 5/2000 | Hager et al. |
| 6,064,653 A | 5/2000 | Farris |
| 6,067,546 A | 5/2000 | Lund |
| 6,069,890 A | 5/2000 | White et al. |
| 6,075,783 A | 6/2000 | Voit |
| 6,078,582 A | 6/2000 | Curry et al. |
| 6,079,036 A | 6/2000 | Moharram |
| 6,084,892 A | 7/2000 | Benash et al. |
| 6,084,956 A | 7/2000 | Turner et al. |
| 6,094,437 A | 7/2000 | Loehndorf, Jr. et al. |
| 6,097,719 A | 8/2000 | Benash et al. |
| 6,097,805 A | 8/2000 | Figurski et al. |
| 6,111,893 A | 8/2000 | Volftsun et al. |
| 6,112,090 A | 8/2000 | Valentine |
| 6,115,383 A | 9/2000 | Bell et al. |
| 6,118,779 A | 9/2000 | Madonna |
| 6,118,780 A | 9/2000 | Dunn et al. |
| 6,119,160 A | 9/2000 | Zhang et al. |
| 6,122,255 A | 9/2000 | Bartholomew et al. |
| 6,122,365 A | 9/2000 | Yegoshin |
| 6,125,111 A | 9/2000 | Snow et al. |
| 6,125,177 A | 9/2000 | Whittaker |
| H1896 H | 10/2000 | Hoffpauir et al. |
| 6,128,379 A | 10/2000 | Smyk |
| 6,134,235 A | 10/2000 | Goldman et al. |
| 6,134,246 A | 10/2000 | Cai et al. |
| 6,137,869 A | 10/2000 | Voit et al. |
| 6,137,874 A | 10/2000 | Brown et al. |
| 6,144,667 A | 11/2000 | Doshi et al. |
| 6,144,670 A | 11/2000 | Sponaugle et al. |
| 6,151,390 A | 11/2000 | Volftsun et al. |
| 6,154,445 A | 11/2000 | Farris et al. |
| 6,154,467 A | 11/2000 | Hager et al. |
| 6,157,710 A | 12/2000 | Figurski et al. |
| 6,167,025 A | 12/2000 | Hsing et al. |
| 6,178,181 B1 | 1/2001 | Glitho |
| 6,195,425 B1 | 2/2001 | Farris |
| 6,201,804 B1 | 3/2001 | Kikinis |
| 6,215,783 B1 | 4/2001 | Neyman |
| 6,236,722 B1 | 5/2001 | Gilbert et al. |
| 6,240,067 B1 | 5/2001 | Sorber |
| 6,278,697 B1 | 8/2001 | Brody et al. |
| 6,298,120 B1 | 10/2001 | Civanlar et al. |
| 6,324,183 B1 | 11/2001 | Miller et al. |
| 6,327,258 B1 | 12/2001 | Deschaine et al. |
| 6,327,267 B1 | 12/2001 | Valentine et al. |
| 6,333,931 B1 | 12/2001 | LaPier et al. |
| 6,366,655 B1 | 4/2002 | Book et al. |
| 6,377,799 B1 | 4/2002 | Hameleers et al. |
| 6,400,813 B1 | 6/2002 | Birnhak |
| 6,415,027 B1 | 7/2002 | Malik |
| 6,442,169 B1 | 8/2002 | Lewis |
| 6,483,837 B1 | 11/2002 | Howell et al. |
| 6,487,286 B1 | 11/2002 | Reaves et al. |
| 6,507,649 B1 | 1/2003 | Tovander |
| 6,515,985 B2 | 2/2003 | Shmulevich et al. |
| 6,515,997 B1 | 2/2003 | Feltner et al. |
| 6,522,667 B1 | 2/2003 | Oda et al. |
| 6,529,524 B1 | 3/2003 | Liao et al. |
| 6,584,190 B1 | 6/2003 | Bressler |
| 6,594,258 B1 | 7/2003 | Larson et al. |
| 6,597,658 B1 | 7/2003 | Simmons |
| 6,611,532 B1 | 8/2003 | Madour et al. |
| 6,611,533 B1 | 8/2003 | Liao et al. |
| 6,625,170 B1 | 9/2003 | Curry et al. |
| 6,625,461 B1 | 9/2003 | Bertacchi |
| 6,631,133 B1 | 10/2003 | Christie et al. |
| 6,674,748 B1 | 1/2004 | Dykhuizen et al. |
| 6,678,242 B1 | 1/2004 | Simon |
| 6,681,009 B1 | 1/2004 | Graf et al. |
| 6,683,881 B1 | 1/2004 | Mijares et al. |
| 6,724,752 B1 | 4/2004 | Turtiainen et al. |
| 6,731,741 B1 | 5/2004 | Fourcand et al. |
| 6,735,621 B1 * | 5/2004 | Yoakum et al. ............... 709/218 |
| 6,760,343 B1 | 7/2004 | Krishnamurthy et al. |

(56) References Cited

U.S. PATENT DOCUMENTS

| | | | |
|---|---|---|---|
| 6,944,184 B1 | 9/2005 | Miller et al. | |
| 7,035,260 B1 | 4/2006 | Betta et al. | |
| 7,079,524 B2 | 7/2006 | Bantukul et al. | |
| 7,197,036 B2 | 3/2007 | Craig | |
| 7,318,091 B2 | 1/2008 | Brendes et al. | |
| 7,486,676 B1 | 2/2009 | Dunn et al. | |
| 7,496,087 B2 | 2/2009 | Garnero et al. | |
| 7,676,702 B2 | 3/2010 | Basham et al. | |
| 7,743,131 B2 | 6/2010 | Brendes et al. | |
| 7,804,789 B2 | 9/2010 | Craig et al. | |
| 8,072,966 B2 | 12/2011 | MeLampy et al. | |
| 8,179,885 B2 | 5/2012 | Craig et al. | |
| 8,224,928 B2 | 7/2012 | Brendes et al. | |
| 8,260,930 B2 | 9/2012 | Khan et al. | |
| 8,792,334 B2 | 7/2014 | Craig et al. | |
| 2001/0029543 A1 | 10/2001 | Iwata et al. | |
| 2001/0046227 A1 | 11/2001 | Matsuhira et al. | |
| 2001/0049730 A1* | 12/2001 | Brendes et al. | 709/223 |
| 2002/0018447 A1 | 2/2002 | Yamada et al. | |
| 2002/0021661 A1 | 2/2002 | DeGrandpre et al. | |
| 2002/0048360 A1 | 4/2002 | Zambre et al. | |
| 2002/0101860 A1* | 8/2002 | Thornton et al. | 370/352 |
| 2002/0103893 A1 | 8/2002 | Frelechoux et al. | |
| 2002/0141386 A1 | 10/2002 | Minert et al. | |
| 2002/0191616 A1 | 12/2002 | Sarmiento et al. | |
| 2003/0032432 A1* | 2/2003 | Red et al. | 455/445 |
| 2003/0076815 A1 | 4/2003 | Miller et al. | |
| 2003/0123436 A1* | 7/2003 | Joseph et al. | 370/352 |
| 2003/0169779 A1* | 9/2003 | Craig | 370/522 |
| 2003/0177221 A1 | 9/2003 | Ould-Brahim et al. | |
| 2003/0179742 A1 | 9/2003 | Ogier et al. | |
| 2003/0202507 A1 | 10/2003 | Nishida et al. | |
| 2004/0017799 A1 | 1/2004 | Pulkka | |
| 2004/0042485 A1 | 3/2004 | Gettala et al. | |
| 2004/0174880 A1* | 9/2004 | White et al. | 370/395.3 |
| 2005/0003838 A1* | 1/2005 | McCann et al. | 455/466 |
| 2005/0099964 A1 | 5/2005 | Delaney et al. | |
| 2005/0232407 A1 | 10/2005 | Craig et al. | |
| 2005/0281399 A1* | 12/2005 | Moisey et al. | 379/126 |
| 2006/0023658 A1 | 2/2006 | Phillips et al. | |
| 2007/0008955 A1 | 1/2007 | Delaney et al. | |
| 2007/0070980 A1 | 3/2007 | Phelps et al. | |
| 2008/0075068 A1 | 3/2008 | Brendes et al. | |
| 2008/0075115 A1 | 3/2008 | Brendes et al. | |
| 2009/0034512 A1* | 2/2009 | Bantukul et al. | 370/352 |
| 2010/0299451 A1 | 11/2010 | Yigang et al. | |
| 2011/0202677 A1 | 8/2011 | Craig et al. | |
| 2012/0218915 A1 | 8/2012 | Craig et al. | |
| 2014/0355482 A1 | 12/2014 | Craig et al. | |

FOREIGN PATENT DOCUMENTS

| | | |
|---|---|---|
| EP | 1 014 735 | 12/1999 |
| EP | 1 054 568 | 5/2000 |
| EP | 1 026 861 A2 | 8/2000 |
| EP | 1 089 575 | 9/2000 |
| EP | 1 206 079 A2 | 5/2002 |
| EP | 1 290 854 B1 | 7/2010 |
| WO | WO 97/11563 | 3/1997 |
| WO | WO 97/33441 | 9/1997 |
| WO | WO 97/42774 | 11/1997 |
| WO | WO 97/42776 | 11/1997 |
| WO | WO 97/46045 | 12/1997 |
| WO | WO 98/28879 | 7/1998 |
| WO | WO 98/28885 | 7/1998 |
| WO | WO 98/28897 | 7/1998 |
| WO | WO 99/09759 | 2/1999 |
| WO | WO 99/16256 | 4/1999 |
| WO | WO 00/19758 | 4/2000 |
| WO | WO 00/22840 | 4/2000 |
| WO | WO 00/30369 | 5/2000 |
| WO | WO 00/31933 | 6/2000 |
| WO | WO 00/33519 | 6/2000 |
| WO | WO 00/54476 | 9/2000 |
| WO | WO 00/56032 | 9/2000 |
| WO | WO 01/11825 | 2/2001 |
| WO | WO 01/24499 | 4/2001 |
| WO | WO 01/37532 | 5/2001 |
| WO | WO 01/93526 A2 | 12/2001 |
| WO | WO 02/067511 A1 | 8/2002 |
| WO | WO 2011/100609 A2 | 8/2011 |

OTHER PUBLICATIONS

Notice of Allowance and Fee(s) due for U.S. Appl. No. 11/986,500 (Mar. 20, 2012).

Notice of Allowance and Fee(s) Due for U.S. Appl. No. 12/878,015 (Jan. 17, 2012).

Interview Summary for U.S. Appl. No. 12/878,015 (Nov. 9, 2011).

Final Official Action for U.S. Appl. No. 11/986,500 (Oct. 20, 2011).

Non-Final Official Action for U.S. Appl. No. 12/878,015 (Aug. 9, 2011).

Restriction/Election Requirement for U.S. Appl. No. 12/878,015 (May 24, 2011).

Communication regarding the expiry of the time limit within which notice of opposition may be filed for European Patent No. 1290854 (May 18, 2011).

Non-Final Official Action for U.S. Appl. No. 11/986,500 (Apr. 1, 2011).

Notice of Allowance and Fee(s) Due for U.S. Appl. No. 11/084,853 (May 24, 2010).

Sidebottom et al., "SS7 MTP3-User Adaptation Layer (M3UA)," Internet Draft, draft-ietf-sigtran-m3ua-02.txt, Network Working Group, pp. 1-56 (Mar. 10, 2000).

Communication under Rule 71(3) EPC for Application No. 01 939 711.6 (Feb. 9, 2010).

Final Official Action for U.S. Appl. No. 11/084,853 (Aug. 18, 2009).

Official Action for U.S. Appl. No. 11/986,493 (Jun. 9, 2009).

Official Action for U.S. Appl. No. 11/084,853 (Jan. 8, 2009).

Communication pursuant to Article 94(3) EPC for European Application No. 01 939 711.6 (Nov. 4, 2008).

Restriction/Election Requirement for U.S. Appl. No. 11/084,853 (Sep. 23, 2008).

Notice of Allowance and Fee(s) Due for U.S. Appl. No. 09/770,316 (Aug. 13, 2007).

Bates et al., "Multiprotocol Extensions for BGP-4," Network Working Group, RFC 4760 (Jan. 2007).

Official Action for U.S. Appl. No. 09/770,316 (Dec. 5, 2006).

3GPP, "3$^{rd}$ Generation Partnership Project; Technical Specification Group Services and System Aspects; IP Multimedia Subsystem (IMS); Stage 2," 3GPP TS 23.228, V6.15.0, p. 1-178 (Sep. 2006).

Advisory Action for U.S. Appl. No. 09/770,316 (Mar. 21, 2006).

Notice of Panel Decision from Pre-Appeal Brief Review for U.S. Appl. No. 09/770,316 (Feb. 14, 2006).

Communication pursuant to Article 96(2) EPC in European Application No. 01939711.6 (Feb. 6, 2006).

Rekhter et al., "A Border Gateway Protocol 4 (BGP-4)," Network Working Group, RFC 4271 (Jan. 2006).

Official Action for U.S. Appl. No. 09/770,316 (Jul. 27, 2005).

Official Action for U.S. Appl. No. 09/770,316 (Nov. 3, 2004).

PAI, "In-Building Wireless: The Next Generation," TelephonyOnline.com, pp. 1-4 (Jun. 30, 2004).

Restriction and/or Election Requirement for U.S. Appl. No. 09/770,316 (Jun. 14, 2004).

Handa, "In Building Wireless: The Next Generation," TMCnet.com, pp. 1-7 (Feb. 12, 2004).

Telcordia Technologies Specification of Signaling System No. 7, "Annex A: SS7 Message Priorities," GR-246-CORE, Issue 8 (Dec. 2003).

Fitchard, "A New Voice in the Boardroom," Wireless Review, pp. 1-3 (Sep. 1, 2003).

Chandra, "Capabilities Advertisement with BGP-4," Network Working Group, RFC 3392 (Nov. 2002).

"Fixed Wireless Technology," ISP Planet, pp. 1-4 (May 14, 2002).

International Search Report for International Application No. PCT/US01/17483 (Mar. 25, 2002).

(56) References Cited

OTHER PUBLICATIONS

Martinek, "Office on the Fly," Wireless Review, pp. 1-4 (Jul. 15, 2001).
"March Networks 3300 Integrated Communications Platformm," Mitel Networks Corporation, pp. 1-34 (Jul. 2001).
Sidebottom et al., "SS7 MTP3-User Adaptation Layer (M3UA)," Internet Draft, Network Working Group, pp. 1-79 (Nov. 2000).
Stewart et al., "Stream Control Transmission Protocol," Request for Comments: 2960, Network Working Group, pp. 1-118 (Oct. 2000).
"Digital Cellular Telecommunications System (Phase 2+) (GSM); Universal Mobile Telecommunications System (UMTS); Telecommunication Management Charging and Billing; 3G Call and Event Data for the Packet Switched (PS) Domain (3GPP TS 32.015 Version 3.3.0 Release 1999)," Global System for Mobile Communications, pp. 1-65 (Sep. 2000).
Sidebottom et al., "SS7 MTP3-User Adaptation Layer (M3UA)," Internet draft, , IETF Network Working Group, p. 1-75, (Sep. 2000).
Subbiah et al., "Transport Architecture Evolution in UMTS/IMT-2000 Cellular Networks," International Journal of Communication Systems, pp. 371-385 (Aug. 11, 2000).
Raivio, "Transport Protocol Evolution in 3G Networks," World Telecommunications Congress/ISS2000, pp. 1-11 (Aug. 5, 2000).
Loughney, "IP-Based Signaling Needs in Radio Access Networks," Internet draft, draft-loughney-sigtran-ip-ran-00.txt, IETF SIGTRAN Working Group, p. 1-14, (Jun. 16, 2000).
Swartz, "Ready, Set, Wireless Office!," Wireless Review, pp. 1-4 (Jun. 1, 2000).
"GPRS: General Packet Radio Service," Usha Communications Technology, pp. 1-23 (Jun. 2000).
"Telstra and Ericcson Trial Next Generation Wireless Office Solution," Ericsson, pp. 1-2 (Apr. 28, 2000).
"Mitel and Ericsson Join Forces to Deliver an Integrated Digital Wireless Office Solution with PBX Functionality—Company Business and Marketing," Cambridge Telcom Report, pp. 1-4 (Apr. 24, 2000).
"Market and Development Agreement Targets Customers Looking for Ways to Become More Productive Through Convenient and Cost-Effective Communciation," Ericsson Press Release, pp. 1-2 (Apr. 4, 2000).
Loughney et al., "SS7 SCCP-User Adaptation Layer (SUA)," Internet draft, draft-loughney-sigtran-sua-00.txt, IETF Engineering Task Force, p. 1-53, (Mar. 8, 2000)
Sulkin, "Emerging Options for Wireless PBXs," Voice2000, pp. 1-8 (Feb. 2000).
Drzewianowski, "WLANs-For the Picking," Communications Solutions™ Netx-Gen Networks, pp. 1-9 (Jan. 2000).
"Universal Mobile Telecommunications System (UMTS); UTRAN Iu Interface: General Aspects and Principles (3G TS 25.410 version 3.1.0 Release 1999)," ETSI, pp. 1-2 (Jan. 2000).
"The Wireless Business Connection," Second Quarter 2000 Report, The Phillips Group—Infotech, pp. 1-9 (2000).
3rd Generation Partnership Project (3GPP), "Technical Specification Group Radio Access Network—UTRAN Overall Description," 3G TS 25.401 version 3.1.0, Release 1999, p. 1-34, (Dec. 17, 1999).
3rd Generation Partnership Project (3GPP), "Technical Specification Group Radio Access Network—UTRAN Iu Interface: General Aspects and Principles," 3G TS 25.410 version 3.1.0, Release 1999, p. 1-23, (Dec. 12, 1999).
"Ericsson Announces General Availability of Its Mobile Advantage Wireless Office System," Ericsson Press Release, pp. 1-2 (Nov. 4, 1999).
Ong et al., "Framework Architecture for Signaling Transport," Network Working Group, pp. 1-24 (Oct. 1999).
ITU-T Recommendation Q.2630.1 (Sep. 29, 1999).
O'Shea, "Mating Season," Telephony, p. 10-11, (Sep. 20, 1999).
"Corporate Offices to Go Wireless First Australian GSM on the Net Trial," Ericsson Press Release, pp. 1-3 (Aug. 11, 1999).
ITU-T Recommendation Q.2150.1 (Jun. 23, 1999).
"Ericsson Solution Chosen for World's First Combined DECT/GSM Communications Service," Ericsson, pp. 1-9 (Jun. 21, 1999).
Hamdi et al., "Voice Service Interworking for PSTN and IP Networks," IEEE Communications Magazine, p. 104-111, (Jun. 5, 1999).
Sprague et al., "Transport Adapter Layer Interface," Tekelec, p. 1-30, (May 28, 1999).
Lakshmi-Ratan, "The Lucent Technologies Softswitch—Realizing the Promise of Convergence," Bell Labs Technical Journal, p. 174-195, (Apr. 5, 1999).
Handley et al., "SIP: Session Initiation Protocol," Internet Draft, Network Working Group, pp. 1-141 (Mar. 1999).
Bressler, "SS7 Level Two Over IP," *Nortel Networks*, pp. 1-6 (Jan. 1999).
Johanson et al., "Mobile Advantage Wireless Office—A Digital Wireless Office System for TDMA/136 Networks," Ericsson Review No. 1, pp. 20-27 (1999).
"Enterprise IP Gateway," Ericcson, pp. 1-6 (1999).
"The Ericsson IPT System," Ericsson, pp. 1-8 (1999).
PCS Access Network Requirements: Interface Specification, Interface: Service Access Socket System Interface (SASSI), Version 01.01, Dec. 3, 1998 (Unpublished).
PCS Access Network Requirements: Product Specification, Network Element: Gateway Signal Transfer Point between CCS/SS7 and TCP-IP Networks (GW-STP-IP), Dec. 3, 1998 (Unpublished).
"Wireless: Top Ericsson Executives Lay Out Corporate Vision, Unveil Strategy for the Enterprise Customer—Company Business and Marketing," EDGE, On & About AT&T, pp. 1-5 (Nov. 30, 1998).
Glaude et al., "SS7 to IP Signaling Gateway Transport Architecture", Internet Engineering Task Force, pp. 1-39 (Nov. 27, 1998).
Michael McGrew, "Transport SS7 Signaling Over IP," Lucent Technologies Inc., p. 1-8 (Nov. 1998).
Cuervo et al., "SSS-Internet Interworking—Architectural Framework," pp. 1-9 (Jul. 1998).
Weekly Status Report for week of Jul. 13-Jul. 17, 1998 (Unpublished).
Weekly Status Report for the weeks of Jul. 6-Jul. 10, 1998 (Unpublished).
Weekly Status Report for week of Jun. 15-Jun. 18, 1998 (Unpublished).
"Ericsson Wireless Office Services to Provide Digital System Through At&T Wireless Services," Ericsson Press Release, pp. 1-2 (Apr. 17, 1998).
Tekelec, "Eagle® Feature Guide," PN/9110-1225-01, (Jan. 1998).
Nichols et al., "Definition of the Differentiated Services Field (DS Field) in the IPv4 and IPv6 Headers," Internet Engineering Task Force RFC 2474, pp. 1-20 (1998).
O'Shea, "The Network That's Never Done," Telephony, p. 38-43, (Sep. 15, 1997).
Tekelec, "Eagle® STP Platform," 908-0134-01, (1997).
Tekelec, "STP Lan Interface Feature," 908-0134-01, (1997).
Tekelec, "STP Database Transport Access Feature," 908-0136-01, (1997).
Tekelec, "STP X.25 to SS7-IS.41 Protocol Conversion Feature," 908-0135-01, (1997).
Tekelec, "STP ANSI-IT Gateway Feature," 908-0133-01, (1997).
Tekelec, "SS7-Frame Relay Access Device SS7 Protocol Information Translator," 908-0167-01, (1997).
Snyder, "Rerouting Internet Traffic Jams," Telephony, p. 12, (Nov. 11, 1996).
Snyder, "Branded With Optics," Telephony, p. 49-50, (Jul. 22, 1996).
Anonymous, "Around the Loop," Telephony, p. 26, (Jul. 22, 1996).
Douglas E. Comer, "Internetworking with TCP/IP," Principles, Protocols, and Architecture, 3rd ed., Prentice Hall (New Jersey), p. 6-8, (1995).
Woods, "Fresno Bee Still Buzzing About Wireless," TechNews, pp. 1-2 (1995).
Bellcore, "Signaling Transfer Point (STP) Generic Requirements," GR-82-Core, Issue 1 (Jun. 1994).
Yang et al., "The Design and Implementation of a Service Logic Execution Environment Platform," IEEE, pp. 1911-1917 (1993).
Almquist, "Type of Service in the Internet Protocol Suite," Internet Engineering Task Force RFC 1349, pp. 1-28 (Jul. 1992).
Zaharychuk et al., "Gateway Signal Transfer Points: Design, Services and Benefits, "IEEE, pp. 223.2.1-223.2.8, (May 29, 1990).

(56) References Cited

OTHER PUBLICATIONS

El-Toumi et al., "Interconnecting SS7 Signaling Networks," AT&T Bell Laboratories, IEEE, pp. 589-593 (1990).
Ex Parte Remark, 1990 WL 354512 (Bd.Pat.App. & Interf. 1990).
Bootman et al., "Generic Building Blocks for the Telecommunications Management Network," IEEE, p. 6.1.1-6.1.5, (1988).
Bootman, "Intelligent Network Services Using a Service Switching Node," IEEE, p. 40.7.1-40.2.4, (1988).
Buckles, "Very High Capacity Signaling Transfer Point for Intelligent Network Services," IEEE, p. 40.2.1-40.2.4, (1988).
Internet Engineering Task Force RFC 791, University of Southern California, "Internet Protocol DARPA Internet Program Protocol Specification," pp. 1-45 (Sep. 1981).
*Henry Mfg. Co. Inc. v. Commercial Filters Corp*, 350 F.Supp. 1015 (S.D. Indiana 1971).
"teleSys Announces the Compatibility of Ericsson's Mobile Advantage Wireless Office and teleSys' MACH7-IP Gateway," teleSys Software-Press Release, pp. 1-2 (Publication Date Unknown).
Non-Final Office Action for U.S. Appl. No. 13/465,464 (Sep. 6, 2013).
Final Official Action for U.S. Appl. No. 13/026,105 (Nov. 26, 2012).
Non-Final Official Action for U.S. Appl. No. 13/026,105 (May 16, 2012).
Notification of Transmittal of the International Search Report and the Written Opinion of the International Searching Authority, or the Declaration for International Application No. PCT/US2011/024621 (Oct. 28, 2011).
Znaty, "Diameter, GPRS, (LTE + ePC = EPS), IMS, PCC and SDM," EFORT (May 2010). (Part 1 of 2, pp. 1-229).
Znaty, "Diameter, GPRS, (LTE + ePC = EPS), IMS, PCC and SDM," EFORT (May 2010). (Part 2 of 2, pp. 230-460).
3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).
Tsou et al., "Realm-Based Redirection in Diameter," Internet Engineering Task Force, draft-ietf-dime-realm-based-redirect-02, pp. 1-7 (Oct. 27, 2009).
Applicant-Initiated Interview Summary for U.S. Appl. No. 13/465,464 (Apr. 22, 2014).
Final Office Action for U.S. Appl. No. 13/465,464 (Feb. 6, 2014).
Advisory Action and Examiner-Initiated Interview Summary for U.S. Appl. No. 13/026,105 (Dec. 15, 2014).
Final Office Action for U.S. Appl. No. 13/026,105 (Sep. 11, 2014).
Notice of Allowance and Fee(s) Due for U.S. Appl. No. 13/465,464 (May 14, 2014).
Non-Final Office Action for U.S. Appl. No. 13/026,105 (May 12, 2014).

* cited by examiner

Exemplary RMP Function Data

| POINT CODE ADDRESS | LRN ADDRESS | DEFAULT DN BLOCK | PREFERRED PSTN GATEWAY ID | ALTERNATE PSTN GATEWAY ID |
|---|---|---|---|---|
| 2-1-1 | 9195550000 | 919380xxxx | GW1 | GW2 |
| 2-1-2 | 9195550001 | 919381xxxx | GW2 | GW1 |

FIG. 3

Exemplary RMP ROUTE MANAGEMENT Message Structure

METHODS, SYSTEMS, AND COMPUTER READABLE MEDIA FOR MANAGING THE FLOW OF SIGNALING TRAFFIC ENTERING A SIGNALING SYSTEM 7 (SS7) BASED NETWORK

PRIORITY CLAIM

This application claims the benefit of U.S. Provisional Patent Application Ser. No. 60/962,766, filed Jul. 31, 2007; the disclosure of which is incorporated herein by reference in its entirety.

TECHNICAL FIELD

The subject matter described herein relates to the distribution of route management information in a non-homogeneous communications network environment. More particularly, the subject matter described herein relates to methods, systems, and computer readable media for managing the flow of signaling traffic entering a signaling system 7 (SS7) based network.

BACKGROUND

Contemporary telecommunications networks may be an amalgam of formerly separate networks that have been merged into a single network, or they may be a single network that must communicate with other types of networks. For example, a packet-switched network, such as an Internet protocol (IP) multimedia subsystem (IMS) network or a next-generation network (NGN), may need to communicate with a circuit-switched network, such as the public switched telephone network (PSTN) or the public land mobile network (PLMN), through gateway nodes. Example gateway nodes include soft switches (SSs), media gateway controllers (MGCs), and signaling gateways (SGWs) that convert signaling messages from one protocol to another protocol. For example, IMS and NGN networks use the session initiation protocol (SIP) for call setup, while PSTN and PLMN networks use signaling system 7 (SS7) for call setup. Thus, signaling gateway nodes may convert signaling messages from SIP protocol to SS7 protocol and vice versa.

Specialized functions have been developed to handle the complexities of the interface between disparate networks. One such function is the breakout gateway control function (BGCF). A BGCF is a function within a packet-switched network, such as an IMS or NGN network, which directs signaling traffic from the packet-switched network in which the BGCF resides into other networks, such as SS7 based networks. The BGCF maintains rules for directing or routing calls between the packet-switched network and a circuit-switched network. A BGCF may communicate with one or more gateway nodes that connect the two networks.

FIG. 1 is a block diagram of a conventional implementation of a merged network having both SS7 and non-SS7 portions. BGCF 100 may be a session initiation protocol (SIP) server that includes routing functionality based on telephone numbers. BGCF 100 communicates with gateway nodes GW1 102 and GW2 104, which connect the non-SS7-based network, such as SIP-based IMS network 106, with the SS7-based network, such as PSTN 108. Because BGCF 100 is a function implemented within the SIP-based network, the SIP-based network is herein referred to as the "internal network" and the SS7-based network is herein referred to as the "external network". Gateway nodes GW1 102 and GW2 104 may be connected to signaling message routing nodes in the SS7 network, such as signal transfer points (STPs). Here, GW1 102 is connected to STP1 110 and GW2 104 is connected to STP2 112. STP1 110 and STP2 112 are connected to each other and to a pair of end offices (EOs), EO1 114 and EO2 116 in a conventional SS7 topology, in which each STP has a connection to both end offices and to the other STP.

In one example, EO1 114 may service PSTN subscribers having directory numbers in the range 9193800000~9193809999. Therefore, BGCF 100 may include routing rules that cause signaling for all calls to 919380xxxx to be routed to EO1 114 via GW1 102. It may be desirable to route signaling for all calls to 919380XXXX through GW1 102, for example, because the signaling route via GW1 102 is a lower cost route relative to the signaling route via GW2 104. Similarly, EO2 116 may service PSTN subscribers having directory numbers in the range 9193810000~9193819999. BGCF 100 may include routing rules that cause signaling for all calls to 919381xxxx to be routed to EO2 116 via GW2 104.

FIG. 1 also illustrates a problem inherent in the conventional implementation of a BGCF. In FIG. 1, the network connection between STP1 110 and EO1 114 has become inoperable, with the result that EO1 114 is unreachable via STP1 110. When STP1 110 detects this fault condition, it may issue a SS7 protocol message, such as the transfer prohibited (TFP) message (FIG. 1, messages 1), to those SS7 signaling points to which STP1 110 is directly connected, in order to inform them that the link between STP1 110 and EO1 114 is down. However, since BGCF 100 is not in the SS7 network, BGCF 100 does not participate in SS7 network management and thus is not aware of the link failure.

Furthermore, BGCF 100 has no information regarding the SS7 network topology and the routing cost structure associated with various potential routes through PSTN 108. In practice, SS7 network conditions are dynamic in nature (due to unexpected network outages, operator initiated outages, changes in route cost structure due to equipment changes or changing service level agreements with network operator partners, etc.) and consequently the least cost route to a particular destination through the SS7 network may vary with time. Since BGCF 100 is not part of the SS7 network PSTN 108, these dynamic variations in SS7 network status and/or underlying route cost structures are not visible to BGCF 100. This shortcoming can lead to significant routing inefficiencies in networking scenarios that involve the use of BGCF nodes to direct traffic into a PSTN or PLMN.

Therefore, BGCF 100 may continue to make traffic routing decisions based on its existing route tables or routing instructions, which may lead to unnecessary congestion and traffic redirection within PSTN 108, IMS network 106, or both. For example, BGCF 100 may be configured to route all signaling messages associated with a DN in the range 919380XXXX to GW1 102, because—unbeknownst to BGCF 100—those DNs are for subscribers associated with EO1 114, and GW1 102 is the least-cost path from BGCF 100 to EO1 114. In the scenario illustrated in FIG. 1, where the link between STP1 110 and EO1 114 is inoperative, a signaling message destined for EO1 114 would continue to be routed from BGCF 100 to GW1 102. Within PSTN 108, the message might travel from GW1 102 to STP1 110, then to STP2 112, and then to EO1 114. Thus, the message would be processed by three nodes (GW1 102, STP1 110, and STP2 112) before arriving at its destination, EO1 114. However, had the message been sent from BGCF 100 to GW2 104 instead of to GW1 102, the message would be processed by only two nodes (GW2 104 and STP2 112) before arriving at EO1 114.

Accordingly, in light of these disadvantages associated with conventional implementations of merged networks, there exists a need for a mechanism for communicating information from an SS7 based network to a non-SS7 based network so that the non-SS7 based network can efficiently route signaling traffic into the SS7 based network. Specifically, there exists a need for methods, systems, and computer readable media for managing the flow of signaling traffic entering a SS7-based network.

SUMMARY

According to one aspect, the subject matter described herein includes a method for managing the flow of signaling traffic entering a signaling system 7 (SS7) based network having a plurality of gateways for connecting the SS7 network to a non-SS7 network. The method includes generating, at a signaling node within the SS7 network, a route management message including information for identifying one of the plurality of gateways as the preferred gateway for traffic into the SS7 network. The message is sent to a node in the non-SS7 network for directing traffic into the SS7 network via the identified gateway.

According to another aspect, the subject matter described herein includes a method for managing the flow of signaling traffic entering a signaling system 7 (SS7) based network. The method includes generating, at a signaling node within an SS7 network, routing information for identifying one of a plurality of gateways for connecting the SS7 network to a non-SS7 network as a preferred gateway for traffic into the SS7 network, and communicating the generated routing information to a node in the non-SS7 network.

According to yet another aspect, the subject matter described herein includes a signaling message processing node for managing the flow of signaling traffic entering a signaling system 7 (SS7) based network having a plurality of gateways for connecting the SS7 network to a non-SS7 network. The signaling message processing node includes a route management proxy function for generating a route management message, the message including information for identifying one of a plurality of gateways for connecting the SS7 network to a non-SS7 network as a preferred gateway for traffic into the SS7 network. The signaling message processing nodes also includes a communications module for sending the message to a node in the non-SS7 network for directing traffic into the SS7 network via the identified gateway.

According to yet another aspect, the subject matter described herein includes a system for managing the flow of signaling traffic entering a signaling system 7 (SS7) based network. The system includes an SS7 network signaling node for generating and sending a route management message using a non-SS7 protocol, the message including information identifying one of a plurality of gateways for connecting the SS7 network to a non-SS7 network as a preferred gateway for traffic into the SS7 network. The system also includes a node in the non-SS7 network for receiving the route management message identifying the preferred gateway and for directing traffic into the SS7 network via the identified gateway.

According to yet another aspect, the subject matter described herein includes a signaling message processing node for managing the flow of signaling traffic entering a signaling system 7 (SS7) based network. The signaling message processing node includes a communications module for receiving a route management message, the message including information identifying one of a plurality of gateways for connecting the SS7 network to a non-SS7 network as a preferred gateway for traffic into the SS7 network. The signaling message processing node also includes a message processing module for identifying, based on the information included in the route management message, one of the plurality of gateways as a preferred gateway for traffic into the SS7 network and for directing traffic into the SS7 network via the identified gateway.

The subject matter described herein for managing the flow of signaling traffic entering a SS7-based network may be implemented in software in combination with hardware and/or firmware. For example, the subject matter described herein can be implemented in software executed by a processor. As such, the terms "function" or "module" as used herein refer to software in combination with hardware and/or firmware for implementing the feature being described. In one exemplary implementation, the subject matter described herein may be implemented using a computer readable medium having stored thereon computer executable instructions that when executed by the processor of a computer perform steps.

Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 3 illustrates the format of exemplary RMP function data that may be used for identifying one of the plurality of gateways as the preferred gateway for traffic to and from an SS7 signaling node according to an embodiment of the subject matter described herein;

DETAILED DESCRIPTION

In accordance with the subject matter disclosed herein, systems, methods, and computer readable media are provided for communicating operating status information associated with a signaling link in a system signaling 7 signaling network to a signaling message processing node in a non-SS7 network.

Figure 1:
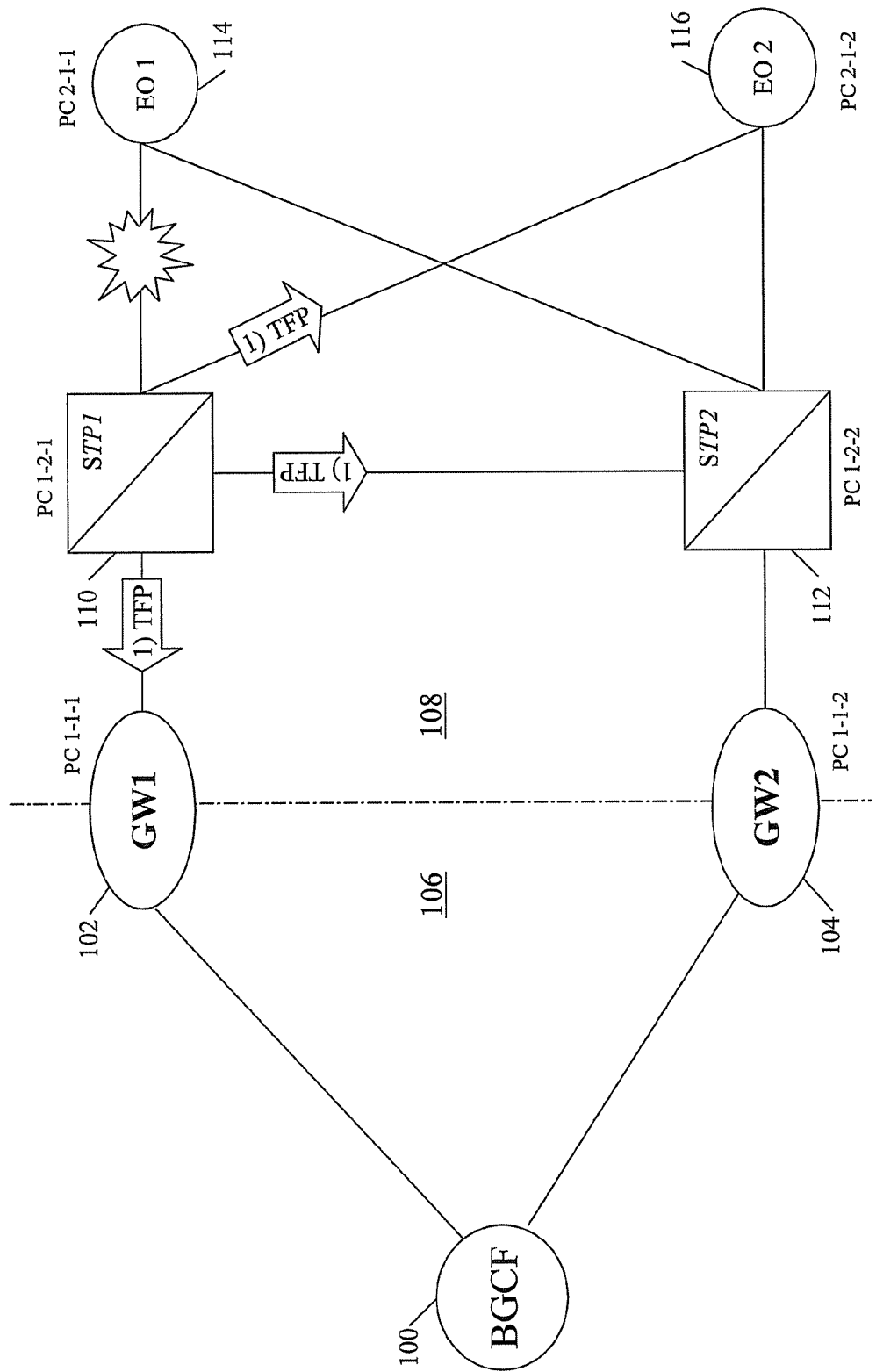
FIG. 1 is a block diagram of a conventional implementation of a merged network having both SS7 and non-SS7 portions.
Figure 2:
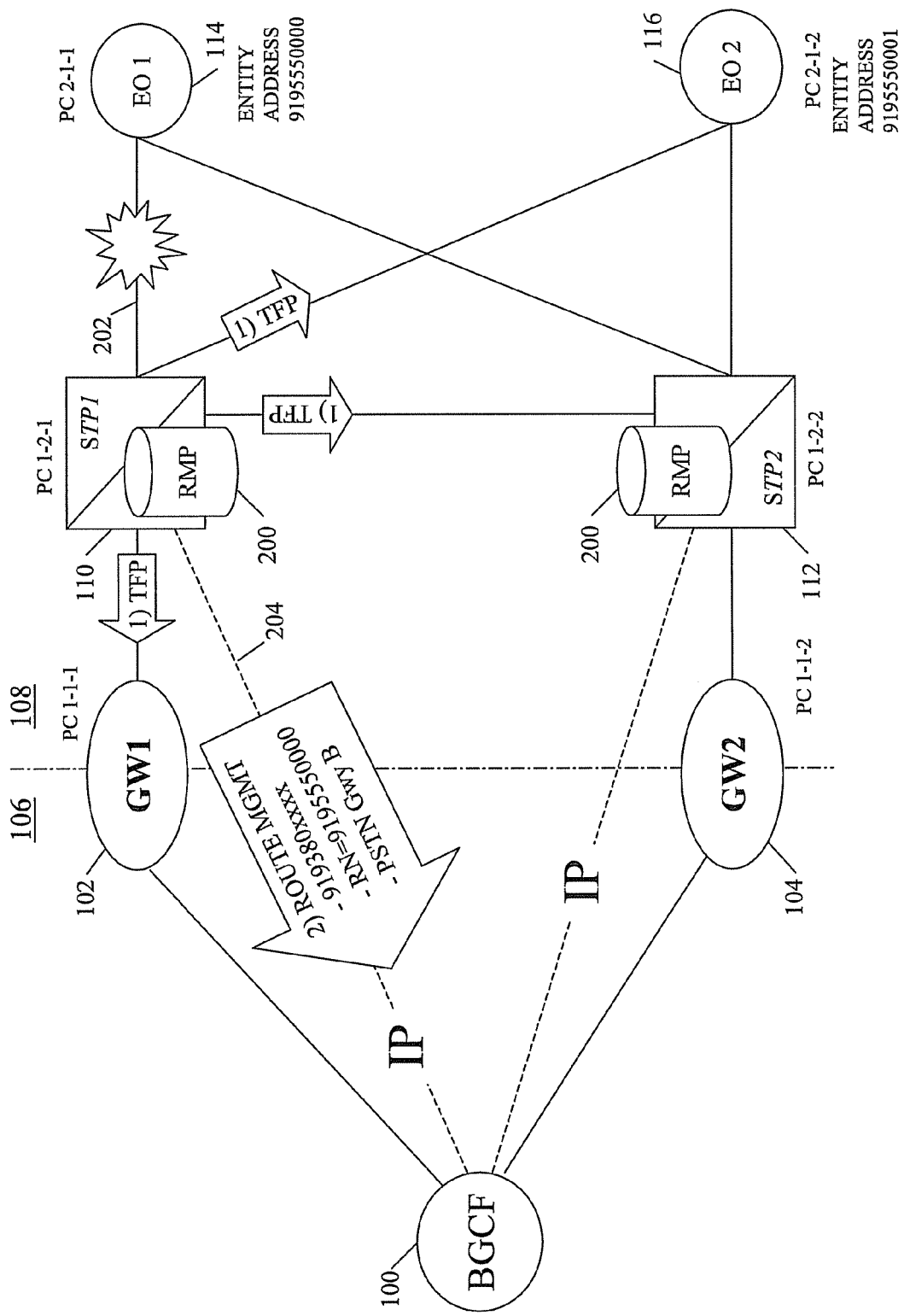
FIG. 2 is a block diagram illustrating an exemplary system for managing the flow of signaling traffic entering a SS7-based network according to an embodiment of the subject matter described herein.

FIG. 2 is a block diagram illustrating an exemplary system for managing the flow of signaling traffic entering a SS7-based network according to an embodiment of the subject matter described herein. In FIG. 2, entities 100, 102, 104, 106, 108, 114, and 116 are the same as the correspondingly-numbered entities described with respect to FIG. 1. Hence, a description thereof is not repeated herein. STP1 110 and STP2 112 are configured to detect a change of operating status of a signaling link within an SS7 signaling network, e.g., PSTN 108. In response to detecting the change of operating status, the respective STP will generate a route management message indicating the change in operating status, and send the generated message to a signaling message processing node in a non-SS7 network, e.g., IMS network 106.

As used herein, the term "non-SS7 protocol" refers to a network protocol that is not based on SS7. Specifically, the term "non-SS7 protocol" excludes protocols that essentially consist of SS7 protocol messages sent using packet protocols such as TCP/IP, such as SIGTRAN, TALI, and SCTP/IP. One example of a non-SS7 protocol is the simple network management protocol (SNMP). SNMP was developed for packet-switched data networks independently of SS7, which was developed for circuit-switched telephony networks.

In the embodiment illustrated in FIG. 2, STP1 110 and STP2 112 may each include a route management proxy module, RMP 200, for facilitating the conveyance of SS7 network status information to non-SS7 signaling points, e.g., BGCF 100. RMP 200 is configured to detect a network management event regarding the operating status of a signaling link within PSTN 108. Example network management events regarding the operating status of a signaling link include detection of a link failure, determination that a link is congested, determination that a previous failure or congestion has been corrected, reception of a message indicating any of the above, and reception of a query regarding the status of a link.

In response to detecting the network management event, RMP 200 may generate a route management message indicating status information associated with the SS7 network, such as the operating status of a signaling link, and send the generated message to a node in the non-SS7 network for directing traffic into the SS7 network, such as BGCF 100, which may direct signaling traffic from the non-SS7 network into the SS7 network. For example, RMP 200 may detect a failure of the signaling link 202 between STP1 110 and EO1 114, and, in response, generate an NMP route management message (FIG. 2, message 2), and send the message to BGCF 100 via an IP link 204. In an alternative embodiment, the NMP route management message may be sent to BGCF 100 via a signaling gateway, such as GW1 102. Other nodes in the non-SS7 network that may receive and process the generated message may include SIP nodes, such as SIP application servers (SAS), and IMS nodes.

FIG. 3 illustrates the format of exemplary RMP function data 300 that may be used by RMP 200 for identifying one of the plurality of gateways as the preferred gateway for traffic to and from an SS7 signaling node according to an embodiment of the subject matter described herein. In one embodiment, RMP 200 may analyze the network failure condition (e.g., failure of signaling link 202) and utilize RMP function data 300 to determine an alternate signaling gateway to be used. Information that identifies the alternate signaling gateway to be used may be explicitly communicated to a signaling node within the non-SS7 network. For example, this information may be communicated to BGCF 100 within IMS network 106.

In one embodiment, RMP function data 300 may be maintained in a database accessible by RMP 200. Alternatively, RMP function data 300 may be maintained in a table, data structure, memory, or other means for storing and maintaining data known in the art.

In the embodiment illustrated in FIG. 3, RMP function data 300 may include a record 302 or entry associated with a particular network entity. Each record 302 may include information identifying a network entity, such as the entity's point code address/subsystem number (PC/SSN 304), a routing number or location routing number (LRN 306) associated with the entity, or other information identifying the network entity. Each record 302 may include information identifying subscriber directory numbers that are served by or affected by the network entity, such as the default DN block 308. Each record 302 may include information indicating a preferred gateway 310 and an alternate gateway 312 through which traffic associated with the identified subscriber DNs should be routed. Other types of information useful for managing the flow of signaling traffic entering an SS7 based network may be included in RMP function data 300.

For example, in the embodiment illustrated in FIG. 3, RMP function data 300 includes information associated with two network entities, EO1 114 and EO2 116. Referring to the information associated with EO1 114, it can be seen that EO1 114 has a point code address of "2-1-1" and a location routing number of 9195550000. EO1 114 serves or is associated with subscriber DNs in the range from 9193800000~9193809999, and traffic associated with those DNs should be preferably routed through GW1 102. If GW1 102 is not available, traffic associated with those DNs may be routed through GW2 104. Similarly, it can be seen that EO2 116 has a point code address of "2-1-2" and a location routing number of 9195550001. EO2 116 serves or is associated with subscriber DNs in the range from 9193810000~9193819999, and traffic associated with those DNs should be preferably routed through GW2 104. If GW2 104 is not available, traffic associated with those DNs may be routed through GW1 102.

Figure 4:
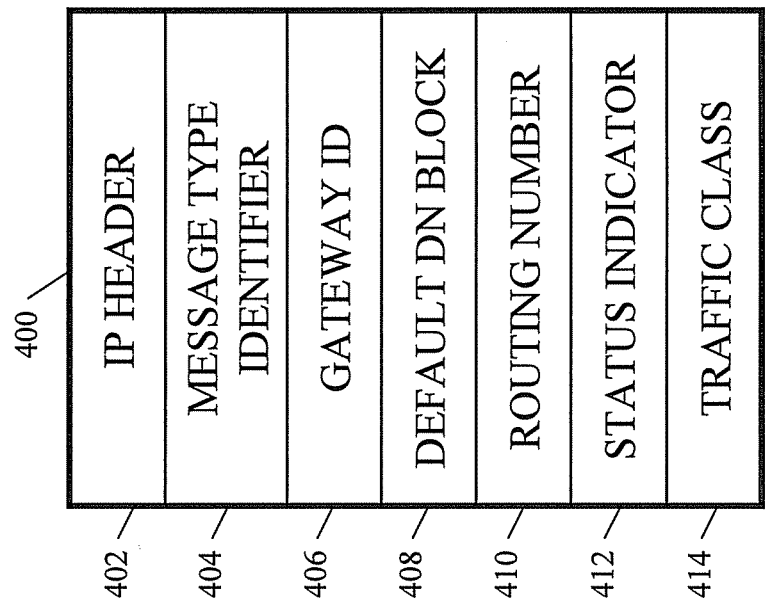
FIG. 4 illustrates the format of an exemplary RMP route management message according to an embodiment of the subject matter described herein.

FIG. 4 illustrates the format of an exemplary NMP route management message (RMP message 400) according to an embodiment of the subject matter described herein. In one embodiment, RMP message 400 may include an IP header 402, which may include routing information. RMP message 400 may include a message type identifier 404, which is used to identify the message as an NMP route management message.

In one embodiment, RMP message 400 may include information that identifies one or more PSTN gateways through which traffic should be routed (gateway ID 406). In one embodiment, gateway ID 406 may identify one or more "preferred" gateways, i.e., gateways through which traffic should or must be routed. Alternatively, gateway ID 406 may identify one or more "disfavored" gateways, i.e., gateways through which traffic should not or must not be routed.

In one embodiment, RMP message 400 may include information indicating which traffic should be routed or re-routed. For example, RMP message 400 may include information that identifies the default directory number (DN) block or range that is affected by the SS7 network event (default DN block 408). RMP message 400 may include information that identifies an entity address or routing number associated with an affected SS7 signaling point (LRN 410). In this manner, RMP message 400 may indicate that only traffic associated with the specified default DN block 408 or LRN 410 is to be directed to gateway ID 406.

In one embodiment, RMP message 400 may include a status indicator 412, which may indicate to the node in the non-SS7 network for directing traffic into the SS7 network whether the affected route is congested, failed, out of service, etc. In the case of congestion, status indicator 412 may also contain information which specifies the level of throttling/re-routing that should be applied by the node in the non-SS7 network for directing traffic into the SS7 network. RMP message 400 may be communicated using Internet protocol (IP), asynchronous transfer mode (ATM), or other higher-layer protocols, such as TCP, UDP, SCTP, HTTP, HTML, XML, SOAP, etc.

In one embodiment, RMP message 400 may include a traffic class 414 or transaction type for indicating which types of traffic are to be directed to a particular gateway. Examples of classes of traffic include: call setup traffic, such as integrated services digital network (ISDN) user part, or ISUP, messages; route resolution messages, such as domain name system (DNS) queries and responses; application access messages, such as transaction capability application part (TCAP) queries and responses; service access messages; mobility management messages; intelligent network (IN or AIN) messages; and others.

Figure 5:
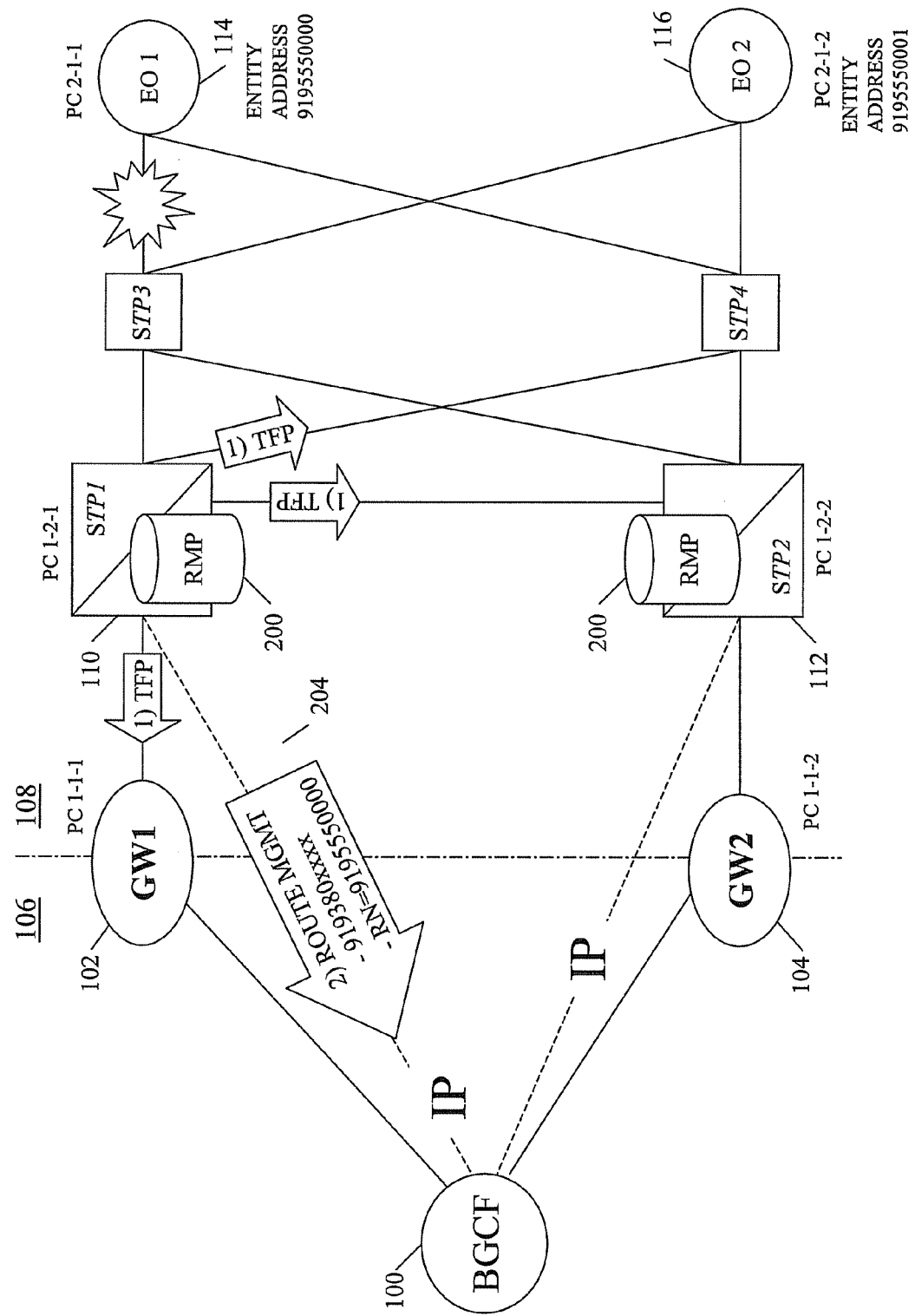
FIG. 5 is a block diagram illustrating an exemplary system for managing the flow of signaling traffic entering a signaling system 7 (SS7) based network according to another embodiment of the subject matter described herein.
Figure 6:
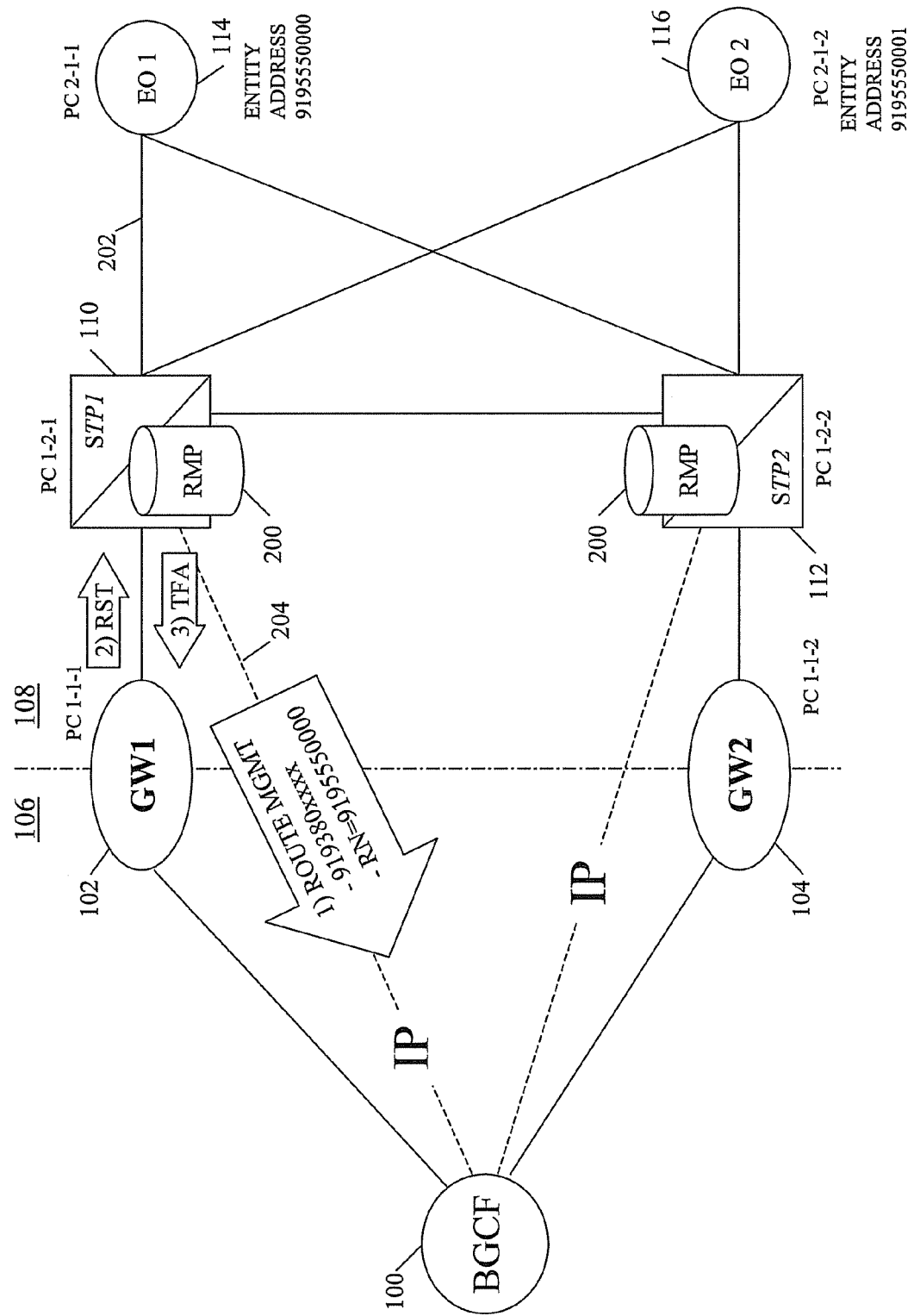
FIG. 6 is a block diagram illustrating an exemplary system for managing the flow of signaling traffic entering a signaling system 7 (SS7) based network according to yet another embodiment of the subject matter described herein.

In an alternative embodiment, RMP message 400 may not include information identifying a signaling gateway to which traffic associated with the specified default DN block 408 or LRN 410 is to be directed. For example, RMP message 400 may not include gateway ID 406 field or the field may contain no value. Such a NMP message may be handled or interpreted in one or more ways: a) the receiving node chooses the gateway; b) the receiving node chooses the default or primary gateway; or c) the receiving node chooses the gateway that is used prior to using the current gateway. The first scenario is described in FIG. 5, while the second and third scenarios are described in FIG. 6, below. The block diagrams illustrated in FIGS. 5 and 6 are substantially identical to the block diagram illustrated in FIG. 2. Entities 100, 102, 104, 106, 108, 110, 112, 114, 116, 200, 202, and 204 are the same as the correspondingly-numbered entities described with respect to FIGS. 1 and 2. Hence, a description thereof is not repeated herein for FIGS. 5 and 6.

FIG. 5 is a block diagram illustrating an exemplary system for managing the flow of signaling traffic entering a signaling system 7 (SS7) based network according to another embodiment of the subject matter described herein. In the embodiment illustrated in FIG. 5, RMP 200 detects a network management event regarding the operating status of a signaling link within PSTN 108. In response, RMP 200 generates a message (FIG. 5, message 2) that conveys status information associated with the SS7 network PSTN 108 and sends the generated message to a node in the non-SS7 network for directing traffic into the SS7 network, e.g., BGCF 100. Here, the information identifies the affected DN block (i.e., "919380XXXX") and/or identifies the affected node (i.e., "RN=9195550000"), but does not specify or recommend a preferred or alternate gateway. In this embodiment, BGCF 100 may use the information contained in the message to determine whether an alternate gateway should be used, and if so, to select the alternate gateway. As can be seen in FIG. 5, STP1 110 may detect a network management event regarding the status of a link (or node) to which STP1 110 is not directly connected.

FIG. 6 is a block diagram illustrating an exemplary system for managing the flow of signaling traffic entering a signaling system 7 (SS7) based network according to yet another embodiment of the subject matter described herein. In the embodiment illustrated in FIG. 6, the NMP route management message (FIG. 6, message 1), which does not include information identifying a gateway, may be interpreted by BGCF 100 to mean that the primary gateway should henceforth be used. In this case, the message conveys an instruction to select the primary gateway, or to resume sending traffic associated with the default DN block/LRN to the original or primary gateway.

Alternatively, the NMP route management message may be interpreted as an instruction to use the gateway that was in use prior to using the current gateway. In this case, the message conveys an instruction to select the previously used gateway. In this embodiment, the context of the NMP route management message may determine its interpretation. For example, a first NMP message specifying no gateway ID may be interpreted to mean select the primary gateway, while subsequent NMP messages specifying no gateway ID may be interpreted to mean select the previously used gateway.

In an alternative embodiment, an NMP route management message containing a status indicator value of "CLEAR" or similar may be used to indicate the SS7 network event that initiated the first route management message has been resolved.

As can be seen in FIG. 6, the recovery of the route may be communicated to other nodes within PSTN 108 by using the SS7 protocol messages route set test (RST) message (FIG. 6, message 2), which may be periodically sent from GW1 102 to STP1 110, and the transfer allowed (TFA) message (FIG. 6, message 3) sent in response from STP1 110 to GW1 102.

Figure 7:
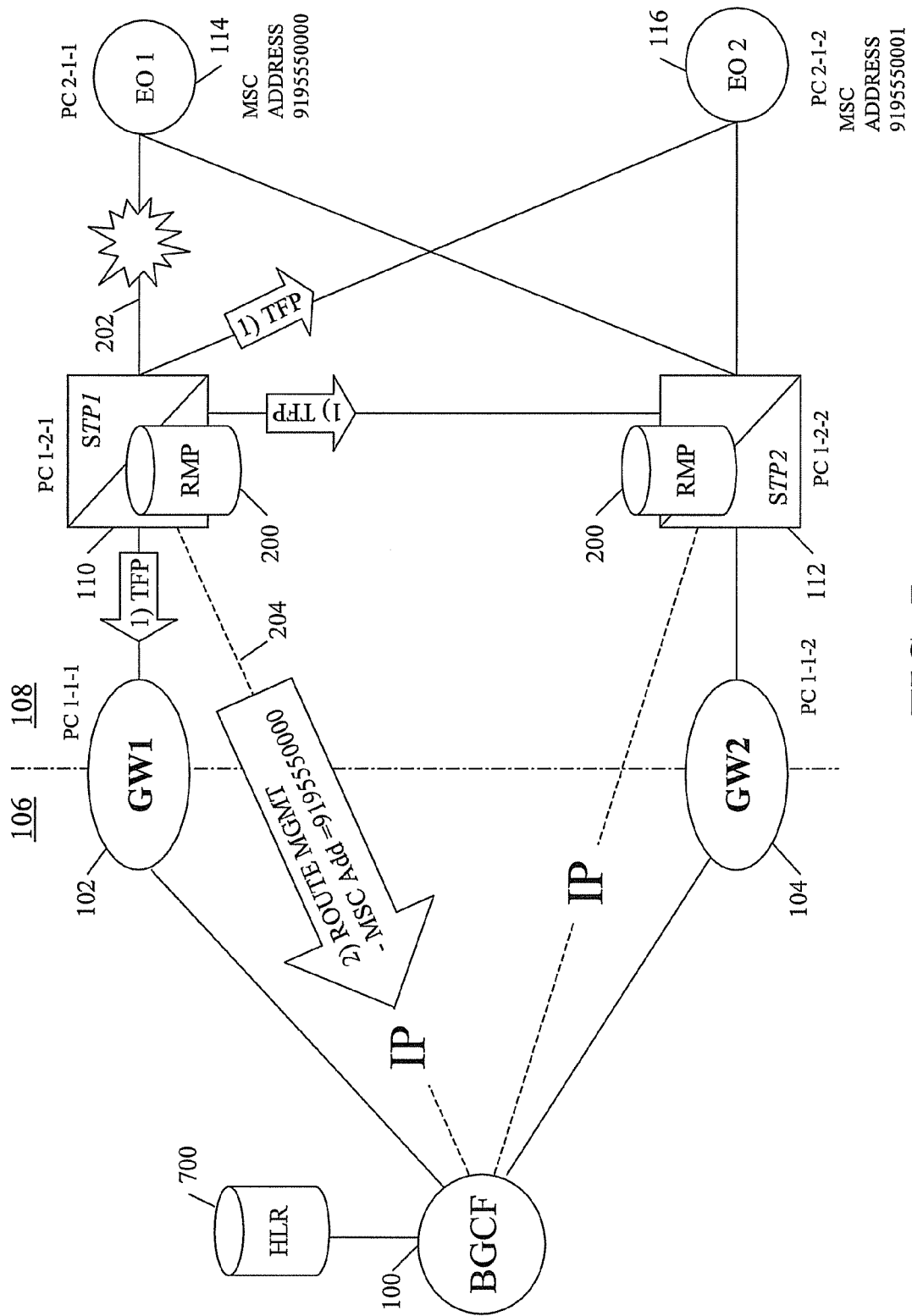
FIG. 7 is a block diagram illustrating an exemplary system for managing the flow of signaling traffic entering an SS7-based network according to yet another embodiment of the subject matter described herein.

FIG. 7 is a block diagram illustrating an exemplary system for managing the flow of signaling traffic entering an SS7-based network according to yet another embodiment of the subject matter described herein. In FIG. 7, entities 100, 102, 104, 106, 108, 110, 112, 114, 116, 200, 202, and 204 are the same as the correspondingly-numbered entities described with respect to FIGS. 1 and 2. Hence, a description thereof is not repeated herein.

FIG. 7 illustrates an embodiment of the present invention for use in a wireless communications network, such as a GSM or IS41 mobile network. In this embodiment, end offices EO1 114 and EO2 116 may be mobile switching centers (MSCs), MSC1 114 and MSC2 116 respectively. Functionally, this embodiment is similar to the embodiments illustrated in FIGS. 2, 5, and 6, except the concept of a default DN block is not relevant. Instead, an MSC services subscribers in a dynamic manner, as they roam into and out of the MSC's service area.

In response to detecting the link failure associated with MSC1 114, RMP 200 may generate a message that contains conveys status information associated with the SS7 network to the node in the non-SS7 network for directing traffic into the SS7 network. In this embodiment, information that identifies the affected MSC may be communicated to BGCF 100. BGCF 100 may utilize this information to select an alternate PSTN Gateway to be used. Status information (e.g., failure, congestion, etc.) may be communicated in the NMP route management message (FIG. 7, message 2) that is generated and sent to BGCF 100. Also, RMP 200 may include in the NMP route management message information that identifies an alternate gateway that is to be used by BGCF 100 for routing signaling traffic associated with the affected MSC Address/ID.

Figure 8:
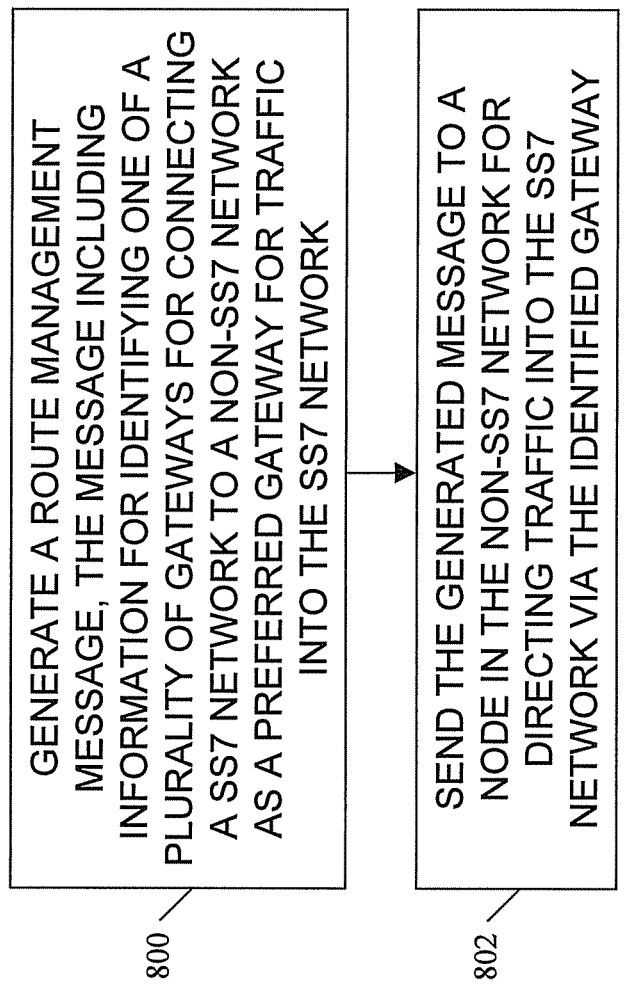
FIG. 8 is a flow chart illustrating an exemplary process for managing the flow of signaling traffic entering an SS7-based network according to an embodiment of the subject matter described herein.

FIG. 8 is a flow chart illustrating an exemplary process for managing the flow of signaling traffic entering an SS7-based network according to an embodiment of the subject matter described herein.

In step 800, a route management message is generated using a non-SS7 protocol, the route management message including information for identifying one of multiple gateways for connecting the SS7 network to a non-SS7 network as the preferred gateway for traffic into the SS7 network. In one embodiment, the route management message may be generated in response to a network management event regarding the operating status of an SS7 network is detected. For example, RMP 200 may detect a failure of a signaling link, such as signaling link 202 between STP1 110 and EO1 114, and send the route management message in response. Other network management events may include detection of congestion of a signaling link, detection of failure or congestion of a node, and recovery of a formerly congested or failed link or node. Network management events may include configuration changes by the network operator, such as removal of a link or node from operation, such as for maintenance, placement of a link or node into service, traffic shaping instructions, and so on. In these scenarios, RMP 200 may receive configuration instructions or messages indicating a change of status of a portion of PSTN 108, for example.

In step 802, the route management message is sent to a node in the non-SS7 network for directing traffic into the SS7 network via the preferred gateway. For example, RMP 200 may send an NMP route management message (FIG. 2, message 2) to BGCF 100 via IP link 204, instructing BGCF 100 to steer some or all traffic associated with subscribers with a DN range of 919380XXXX into PSTN 108 via GW2 104.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for managing the flow of signaling traffic entering a signaling system 7 (SS7) network, the method comprising:
at a signaling device within the SS7 network, the SS7 network having a plurality of signaling gateways for connecting the SS7 network to a non-SS7 network:
storing route management proxy information associating a range of subscriber directory numbers with a preferred signaling gateway and an alternate signaling gateway, different from the preferred signaling gateway, for accessing the SS7 network;
detecting a network management event, wherein the network management event is a change in status of a signaling link in the SS7 network, and, in response:
generating a route management proxy message, the message including information associating the range of directory numbers with the alternate signaling gateway; and
sending the message to a breakout gateway control function device in the non-SS7 network, the breakout gateway control function directing signaling traffic from the non-SS7 network to the SS7 network, the message for directing the breakout gateway control function device to change its entry point for signaling traffic associated with the range of directory numbers into the SS7 network from the preferred signaling gateway to the alternate signaling gateway.

2. The method of claim 1, wherein the signaling device within the SS7network comprises one of a signal transfer point (STP), a service switching point (SSP), a mobile switching center (MSC), and a media gateway controller (MGC).

3. The method of claim 1, wherein the route management proxy message comprises a non-SS7 protocol message.

4. The method of claim 1, wherein the change in status of the signaling link comprises congestion, failure, or recovery of the signaling link.

5. The method of claim 1, wherein the route management proxy message includes information identifying which signaling traffic is to be directed through the alternate signaling gateway.

6. The method of claim 5, wherein the information identifying which signaling traffic is to be directed through the alternate signaling gateway includes at least one of a routing number of an SS7 device, a directory number of a subscriber, the range of subscriber directory numbers, and a transaction type.

7. The method of claim 1, wherein the route management proxy message includes information indicating a status of a route within the SS7 network.

8. The method of claim 7, wherein the information indicating a status of a route comprises information indicating at least one of:
a removal of the route from service;
a failure of the route;
a level of congestion of the route;
an amount of traffic throttling for the route;
a recovery of the route; and
a placement of the route into service.

9. The method of claim 1, wherein sending the message to the breakout gateway control function device in the non-SS7 network for directing the signaling traffic into the SS7 network includes sending the message to the breakout gateway control function device in a session initiation protocol (SIP) network.

10. The method of claim 1, wherein sending the message to the breakout gateway control function node in the non-SS7 network for directing the signaling traffic into the SS7 network includes sending the message to an Internet protocol multimedia subsystem (IMS) breakout gateway control function device.

11. The method of claim 1, wherein the route management proxy information comprises information identifying one of the plurality of signaling gateways as a disfavored signaling gateway for the signaling traffic into the SS7 network.

12. A method for managing the flow of signaling traffic entering a signaling system 7(SS7) network, the method comprising:
storing, at a signaling node within the SS7 network, route management proxy information associating a range of subscriber directory numbers with a preferred signaling gateway and an alternate signaling gateway different from the preferred signaling gateway for accessing the SS7 network;
detecting, at the signaling device, a network management event, wherein the network management event is a change in status of a signaling link in the SS7 network;
generating, at the signaling device and in response to the network management event, route management proxy information for associating the range of subscriber directory numbers with the alternate signaling gateway; and
communicating, in response to the network management event, the generated route management proxy information to a breakout gateway control function device in the non-SS7 network, the breakout gateway control function device for directing signaling traffic from the non-SS7 network to the SS7 network, the message for directing the breakout gateway control function device to change its entry point for signaling traffic associated with the range of directory numbers into the SS7 network from the preferred signaling gateway to the alternate signaling gateway.

13. A signaling message processing device for managing the flow of signaling traffic entering a signaling system 7 (SS7) based network, the signaling message processing device comprising:
   a route management proxy module executable by a processor for storing route management proxy information associating a range of subscriber directory numbers with a preferred signaling gateway and an alternate signaling gateway different from the preferred signaling gateway for accessing the SS7 network, detecting a network management event, wherein the network management event is a change in status of a signaling link in the SS7 network, and, in response, generating a route management proxy message, the message including information associating the range of directory numbers with the alternate signaling gateway; and
   a communications module executable by a processor for sending the message to a breakout gateway control function device in the non-SS7 network, the breakout gateway control function device for directing signaling traffic from the non-SS7 network to the SS7 network, the message for directing the breakout gateway control function device to change its entry point for signaling traffic associated with the range of directory numbers into the SS7 network from the preferred signaling gateway to the alternate signaling gateway.

14. The signaling message processing device of claim 13, wherein the signaling message processing device comprises one of a signal transfer point (STP), a service switching point (SSP), a mobile switching center (MSC), and a media gateway controller (MGC).

15. The signaling message processing device of claim 13, wherein the route management proxy message comprises a non-SS7 protocol message.

16. The signaling message processing device of claim 13, wherein the change in status of the signaling link comprises congestion, failure, or recovery of the signaling link.

17. The signaling message processing device of claim 13, wherein the route management proxy message includes information identifying which of the signaling traffic is to be directed through the identified signaling gateway.

18. The signaling message processing device of claim 17, wherein the information identifying which of the signaling traffic is to be directed through the identified signaling gateway includes at least one of a routing number of an SS7 device, a directory number of a subscriber, the range of subscriber directory numbers, and a transaction type.

19. The signaling message processing device of claim 13, wherein the route management proxy message includes information indicating a status of a route within the SS7 network.

20. The signaling message processing device of claim 19, wherein the information indicating a status of a route comprises information indicating at least one of:
   a removal of the route from service;
   a failure of the route;
   a level of congestion of the route;
   an amount of traffic throttling for the route;
   a recovery of the route; and
   a placement of the route into service.

21. The signaling message processing device of claim 13, wherein the communications module is configured to send the message to the breakout gateway control function node in a session initiation protocol (SIP) network.

22. The signaling message processing device of claim 13, wherein the communications module is configured to send the message to an Internet protocol multimedia subsystem (IMS) network breakout gateway control function node.

23. The signaling message processing device of claim 13, wherein information identifying one of a plurality of signaling gateways for connecting the SS7 network to a non-SS7 network as a preferred signaling gateway for traffic into the SS7 network comprises information identifying one of the plurality of signaling gateways as a disfavored signaling gateway for traffic into the SS7 network.

24. A system for managing the flow of signaling traffic entering a signaling system 7 (SS7) network, the system comprising:
   an SS7 network signaling device for storing route management proxy information associating a range of subscriber directory numbers with a preferred signaling gateway and an alternate signaling gateway for accessing the SS7 network, detecting a network management event, wherein the network management event is a change in status of a signaling link in the SS7 network, and, in response to the network management event, generating and sending a route management proxy message, the message including route management proxy information associating the range of subscriber directory numbers with the alternate signaling gateway; and
   a breakout gateway control function device for residing in the non-SS7 network, directing signaling traffic from the non-SS7 network to the SS7 network, receiving the route management proxy message associating the range of subscriber identifiers with the alternate signaling gateway and directing the breakout gateway control function device to change its entry point for signaling traffic associated with the range of directory numbers into the SS7 network from the preferred signaling gateway to the alternate signaling gateway.

25. A breakout gateway control function device for managing the flow of signaling traffic entering a signaling system 7 (SS7) network, the breakout gateway control function device comprising:
   a communications module executable by a processor for receiving, an originating node and in response to a network management event detected by the originating device, a route management proxy message, the message including route management proxy information a range of subscriber directory numbers with a preferred signaling gateway and an alternate signaling gateway, wherein the network management event is a change in status of a signaling link in the SS7 network; and
   a message processing module executable by a processor for identifying, based on the information included in the route management message, changing an entry point for signaling traffic associated with the range of directory numbers into the SS7 network from the preferred signaling gateway to the alternate signaling gateway.

26. A computer program product comprising computer executable instructions embodied in a non-transitory computer readable medium for performing steps comprising:
   at a signaling device within a signaling system 7 (SS7) network, the SS7 network having a plurality of signaling gateways for connecting the SS7 network to a non-SS7 network:

storing route management proxy information associating a range of subscriber directory numbers with a preferred signaling gateway and an alternate signaling gateway, different from the preferred signaling gateway, for accessing the SS7 network;

detecting a network management event, wherein the network management event is a change in status of a signaling link in the SS7 network, and, in response:

generating a route management proxy message, the message including route management proxy information for identifying associating the range of subscriber directory numbers with the alternate signaling gateway; and sending the message to a breakout gateway control function device in the non-SS7 network, the breakout gateway control function device for directing signaling traffic from the non-SS7 network to the SS7 network, the message for directing the breakout gateway control function device to change its entry point for signaling traffic associated with the range of directory numbers into the SS7 network from the signaling preferred signaling gateway to the alternate signaling gateway.

* * * * *